May 20, 1930.　　　A. THIRIET ET AL　　　1,759,526
PREPARATION OF ROSIN SOLUTIONS
Filed June 21, 1926
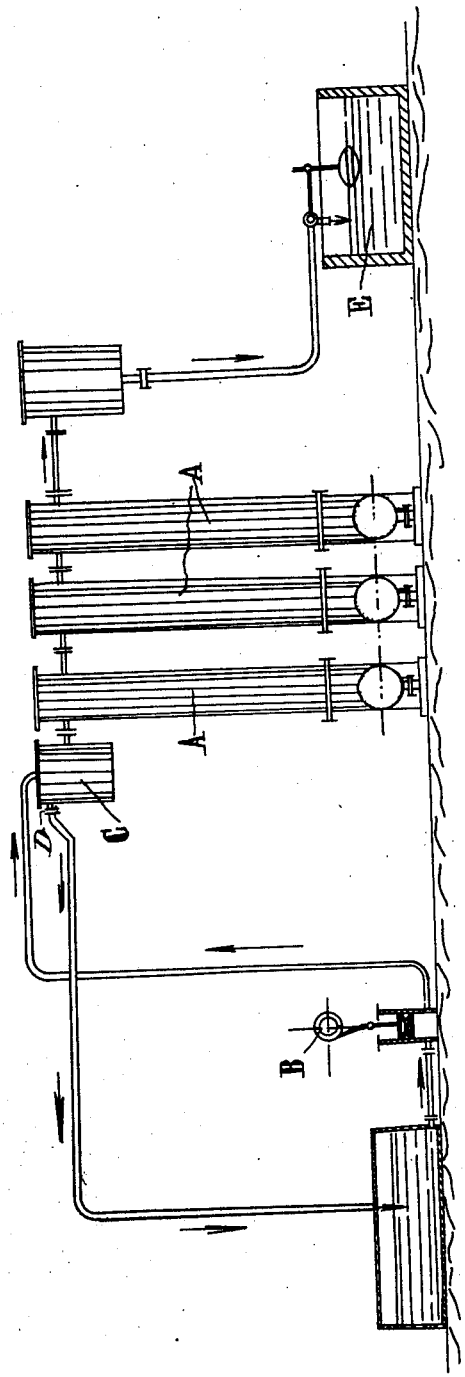
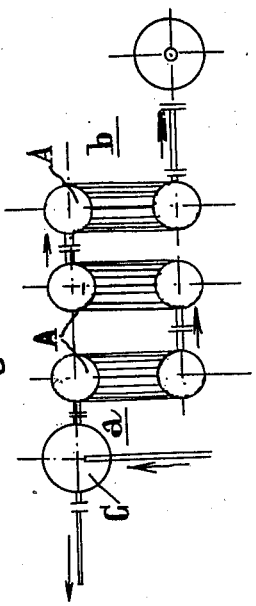
INVENTORS:
André Thiriet
and Pierre Delcroix
By  Luis Paniel
ATTORNEY Patented May 20, 1930

1,759,526

UNITED STATES PATENT OFFICE

ANDRÉ THIRIET AND PIERRE DELCROIX, OF VOIRON, FRANCE, ASSIGNORS, BY MESNE ASSIGNMENTS, TO PROCÉDÉS NAVARRE, OF LYON, FRANCE

PREPARATION OF ROSIN SOLUTIONS   REISSUED

Application filed June 21, 1926, Serial No. 117,621, and in Germany April 10, 1926.

The present invention relates to the production of rosin solutions without the application of heat. The solutions obtained according to the invention are particularly useful for sizing paper or cardboard, but can also be used generally in all cases in which resin suspensions or resin soap (which have previously been obtained through the medium of an alkali soap) are required. The colour-lake and pigment industries, for example, are among those requiring these products.

The essential feature of the improved process consists in that the intermediate stage consisting of making a soap concentrated with rosin is rendered unnecessary by causing a cold solution of soda to act directly on rosin. The rosin solution thus obtained is perfectly clear or transparent, as distinguished from the prior processes in which the liquid is opaque.

Rosin solutions similar to resin soap (i. e., clear solutions of sodium resinate having free soda slightly in excess) may be obtained at will from the reaction caused by passing a cold soda solution over rosin. It is possible to produce the reaction with all materials in the cold state and to obtain a satisfactory yield with a low concentration of less than 10 grammes of caustic soda per liter.

In the accompanying drawing, which illustrates a constructional example of apparatus that may be used with advantage for dissolving rosin according to the present process, Figure 1 is a vertical section of the apparatus taken on line $a$—$b$ of Fig. 2, which latter is a fragmental plan view.

A soda solution is passed in succession through vertical columns A filled with pieces of rosin. The number, diameter and height of the columns vary in accordance with the quantity of solution to be obtained. A clear solution with a uniform proportion of rosin per liter is obtained in this manner. Since the proportion of rosin may be varied at will in accordance with the output set, the soda solution is supplied to the apparatus by means, for example, of a pump B, the rate of supply of which is uniform with each case. In the apparatus illustrated, the soda solution is pumped into a receptacle C having an overflow D, and then passes through the columns, whereafter it reaches a container E for storing the rosin solution. Separate devices may be provided for the purpose of automatically discontinuing the supply of soda solution when the container E is full.

We claim:

1. The process which comprises the single step of passing a cold solution of caustic soda having a concentration of less than 10 grammes per liter directly over pieces of rosin, so as to obtain a true solution of the constituents of rosin immediately from such treatment.

2. A continuous process of producing rosin solutions, comprising the single step of passing a cold solution of caustic soda over roughly-ground rosin, so as to obtain a true solution of the constituents of rosin immediately from such treatment.

3. A clear solution, consisting of a completely saponified rosin-soda soap dissolved in a solution of caustic soda, the total content of soda, both combined and in solution, being less than 10 grammes per liter.

In testimony thereof we affix our signatures.

ANDRÉ THIRIET.
PIERRE DELCROIX.